United States Patent
Zhong

(10) Patent No.: US 12,473,243 B2
(45) Date of Patent: Nov. 18, 2025

(54) POLYESTER POLYOL WITH HIGH BIOMASS RATIO FOR POLYURETHANE CONTROLLED-RELEASE FERTILIZER ENVELOPE, PREPARATION METHOD THEREOF AND ENVELOPE

(71) Applicant: Maoshi Agricultural Technology Co., Ltd, Anhui (CN)

(72) Inventor: Chenghu Zhong, Anhui (CN)

(73) Assignee: Maoshi Agricultural Technology Co., Ltd, Chizhou (CN)

( * ) Notice: Subject to any disclaimer, the term of this patent is extended or adjusted under 35 U.S.C. 154(b) by 964 days.

(21) Appl. No.: 17/589,538

(22) Filed: Jan. 31, 2022

(65) Prior Publication Data
US 2022/0153654 A1   May 19, 2022

(30) Foreign Application Priority Data
Dec. 21, 2021 (CN) .......................... 202111569729.7

(51) Int. Cl.
  *C07B 41/12* (2006.01)
  *C07B 41/02* (2006.01)
  *C05G 3/40* (2020.01)
  *C08G 18/42* (2006.01)

(52) U.S. Cl.
  CPC .............. *C07B 41/12* (2013.01); *C07B 41/02* (2013.01); *C05G 3/40* (2020.02); *C08G 18/4294* (2013.01)

(58) Field of Classification Search
  None
  See application file for complete search history.

(56) References Cited

FOREIGN PATENT DOCUMENTS

CN    103819660 A  *  5/2014

OTHER PUBLICATIONS

Machine translation of CN 103819660A (Year: NA).*
Wang et al (Polyurethane Networks from Different Soy-Based Polyols by the Ring Opening of Epoxidized Soybean Oil with Methanol, Glycol, and 1,2-Propanediol, Journal of Applied Polymer Science, vol. 114, 125-131 (2009)) (Year: 2009).*

* cited by examiner

*Primary Examiner* — Rachel Kahn

(57) ABSTRACT

Epoxy soybean oil polyol is firstly prepared by open-ring etherification of an epoxy soybean oil and a small molecular alcohol with an organic acid catalyst, and then the epoxy soybean oil polyol is further esterified with an organic acid under an esterification catalyst to prepare a polyester polyol with a high biomass ratio. The polyester polyol includes a compound having an Ñ-type structure and a compound having an Õ-type structure. A method for preparing the polyester polyol is provided, as well as a polyurethane controlled-release fertilizer envelope and a polyurethane controlled-release fertilizer prepared by cross-linking the polyester polyol and MDI on surfaces of the fertilizer. The epoxy soybean oil and the small molecular alcohol can be derived from biomass, so a biomass content is high, the synthesized product is environmentally safe, and product performance is excellent.

9 Claims, No Drawings

POLYESTER POLYOL WITH HIGH BIOMASS RATIO FOR POLYURETHANE CONTROLLED-RELEASE FERTILIZER ENVELOPE, PREPARATION METHOD THEREOF AND ENVELOPE

CROSS REFERENCE OF RELATED APPLICATION

The present invention claims priority under 35 U.S.C. 119(a-d) to CN 202111569729.7, filed Dec. 21, 2021.

BACKGROUND OF THE PRESENT INVENTION

Field of Invention

The present invention relates to a technical field of envelope materials for controlled-release fertilizers, and more particularly to a polyester polyol with a high biomass ratio for a polyurethane controlled-release fertilizer envelope, a preparation method thereof, and an envelope.

Description of Related Arts

Fertilizer is an important means of agricultural production, and the development of agriculture is also inseparable from fertilizer. Chemical fertilizer is widely used because of its rich content of fast-acting nutrients and remarkable yield increase effect. However, in practice, there are problems of unreasonable use structure, excessive application and low utilization rate. Specifically, farmers only pay attention to the use of the chemical fertilizers in the production process, and in order to obtain better fertilizer efficiency, they will blindly increase the amount of the chemical fertilizer.

Conventionally, Chinese fertilizer production and usage the first rank in the world. With the long-term use of chemical fertilizer, the basic soil fertility is gradually weakening, which has become an important limiting factor affecting the sustainable development of Chinese agriculture as well as the high and stable production of crops. In addition, conventional fertilizer will quickly dissolve in the soil, wherein factors such as fixing or volatilizing will lead to excessive supply in an early stage and insufficient supply in a later stage, causing a low utilization rate. In order to effectively control the timely release of fertilizer nutrients and improve fertilizer utilization, various new fertilizers have been developed, such as enveloped controlled-release fertilizers and long-term fertilizers. The enveloped controlled-release fertilizer uses various mechanisms to slowly release nutrients at first, thereby prolonging the effective period of crop absorption and utilization of effective nutrients, and slowly releasing or controlling the release of nutrients according to a preset release rate and release period.

Conventionally, the enveloped controlled-release fertilizers in the world are mainly enveloped polymer fertilizers. According to material properties, there are two categories: thermoplastic resin envelope and thermosetting resin envelope. Most of the thermoplastic envelope controlled-release fertilizers use solvents to first dissolve the envelope resin, and then gradually spray it on the fertilizer particles in a sedimentation bed enveloping tower to form an envelope. Although this kind of enveloped fertilizer has a good nutrient release function, the production cost is relatively high due to the high price of resin, making it difficult to popularize and use in agriculture on a large scale. Thermosetting resin enveloped controlled-release fertilizer is made of polymer materials such as epoxy resin and alkyd resin. The main feature of these enveloped controlled-release fertilizers is that the resin and curing agent are mixed uniformly and sprayed on the surface of the fertilizer particles to directly to form an envelope. The process is simple to prepare, fast for curing, and very suitable for large-scale production. However, this resin envelope material is also expensive, so the controlled-release fertilizer produced has a high price, which is difficult to promote and apply in field crops.

Chinese patent "Controlled-release fertilizer with epoxy soybean oil modified resin envelope and its preparation method" (application No.: Cn 201210261466.8, patent publication No: CN102795923B) disclosed a controlled-release fertilizer with an epoxy soybean oil modified thermosetting resin envelope. The granular fertilizer with a particle size of 2-5 mm is placed in a drum to preheat to 60-90° C., and then epoxy soybean oil, epoxy resin, diluent, and curing agent are mixed uniformly in a certain proportion before being added or sprayed to the surface of the pre-heated fertilizer particles. After a few minutes, the materials react and cure to form a smooth and dense modified epoxy resin envelope controlled-release fertilizer with different nutrient release properties. This method is solvent-free, requires no special equipment, has a short curing time, and has good nutrient release performance. However, the envelope resin used in this method is epoxy resin, which has poor heat resistance, high price, and poor degradability.

Chinese patent "Special base fertilizer for winter wheat and its preparation method" (application No.: CN201210270956.4, patent publication number: CN102826896B) disclosed a special base fertilizer for winter wheat, whose raw material components comprise camellia seed cake 10-20, enveloped urea 4-5, enveloped diammonium phosphate 18-20, potassium chloride 5-8, coal ash 20-30, ferrous sulfate 1-2, zinc sulfate 0.1-0.5, boric acid 0.1-0.3, sepiolite 10-12, bamboo charcoal 5-7, Chinese bittersweet powder 3-4, oleander powder 3-4, bagasse 10-15, iron ore 10-15, cow manure 18-22, carboxymethyl cellulose 3-4, 30% sulfuric acid 15-20, lime 5-10, soybean meal 10-15, and epoxy soybean oil 4-6. First, hair is acid-hydrolyzed into amino acids, so as to prepare amino acid chelated micro and medium fertilizer liquid. Then the iron ore is sintered to obtain a fertilizer carrier. The organic fertilizer is fermented, and then the nitrogen, phosphorus and potassium fertilizers are mixed with the carrier, organic fertilizer and plant pesticide before granulating through spraying the amino acid chelated micro and medium fertilizer solution. Finally, the epoxy soybean oil is used as an envelope. The fertilizer prepared can improve the fertilizer efficiency utilization rate, provide a slow-release effect, reduce the using amount of the fertilizer, and reduce pesticide residues. However, a wide variety of raw materials are used and a complicated preparation method is adopted. Preparation process and performance still need to be adjusted to improve the slow-release performance of the fertilizer.

Therefore, the development of new materials and new technologies for enveloped controlled-release fertilizers with low cost, good stability, high degradability and mass production has great significance to the development and industrialization of controlled-release fertilizers.

SUMMARY OF THE PRESENT INVENTION

In order to solve the above problems, the present invention provides a polyester polyol with a high biomass ratio for a polyurethane controlled-release fertilizer envelope and a preparation method thereof. The polyester polyol prepared by the present invention is cross-linked with MDI on a surface of a fertilizer, so as to form a polyurethane controlled-release fertilizer envelope material, thereby providing a polyurethane controlled-release fertilizer. Synthetic raw material, epoxy soybean oil and small molecular polyol, of the present invention can be derived from biomass. Therefore, the prepared polyester polyol has a high biomass content, and the biomass raw material can be more than 50% in the polyester polyol. The synthesized product is environmentally safe and has excellent product performance, which is high degradable, is eco-friendly, and low in cost.

Accordingly, in order to accomplish the above objects, the present invention provides technical solutions as follows.

First, the present invention provides a polyester polyol with a high biomass ratio for a polyurethane controlled-release fertilizer envelope, comprising a compound having an Ñ-type structure as shown in a formula (1) and a compound having an Ò-type structure as shown in a formula (2):

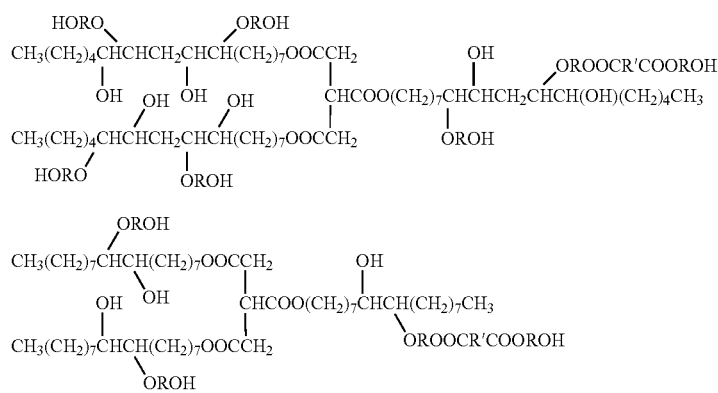

wherein R is selected from a group consisting of: $CH_2CH_2$, $CH_2CH_2OCH_2CH_2$, $CH_2CH(CH_3)$, $CH_2CH(CH_3)OCH_2CH(CH_3)$, $CH_2CH_2CH_2CH_2$ and $CH_2CH(OH)CH_2$; R' is selected from a group consisting of: Ph, $CH_2CH_2CH_2CH_2$, $CH_2CH_2$ and $CH_2(CH_2)_6CH_2$.

Preferably, a hydroxyl value of the compound having the Ñ-type structure as shown in the formula (1) is 150-350 mgKOH/g.

Preferably, a hydroxyl value of the compound having the Ò-type structure as shown in the formula (2) is 150-350 mgKOH/g.

The present invention also provides a method for preparing the polyester polyol as recited in claim 1, comprising steps of:

(1) processing an epoxy soybean oil and a small molecular alcohol with an organic acid catalyst to form an epoxy soybean oil polyol through an open-ring etherification reaction, which comprises specific steps of:

adding a certain proportion of the organic acid catalyst into the small molecular alcohol in a reactor, then heating to 120-160° C.; stopping heating and adding the epoxy soybean oil to the reactor in batches to perform the open-ring etherification reaction; controlling a reaction temperature of reactants at 160-200° C. until a required amount of the epoxy soybean oil is added; keeping a reaction solution at 180-200° C. for 1-3 hours and then cooling to obtain a yellow transparent viscous liquid, which is the epoxy soybean oil polyol, for subsequent use; wherein a molar ratio of the epoxy soybean oil and the small molecule alcohol is 1:4-1:7.5; an adding amount of the organic acid catalyst is 0.1-0.5% of a total reactant mass;

wherein such reaction is an exothermic reaction, and adding all the epoxy soybean oil at one time will make it difficult to control the reaction temperature; therefore, the present invention adds the epoxy soybean oil in batches to carry out the open-ring etherification reaction, and the reaction temperature is controlled at 160-200° C. to make the reaction process more controllable, thereby reducing side reactions such as cross-linking; and (2) processing the epoxy soybean oil polyol and an organic acid with an esterification catalyst to form the polyester polyol, which comprises specific steps of:

adding the epoxy soybean oil polyol prepared in the step (1) and the organic acid into the reactor according to a certain mass percentage, then adding the esterification catalyst and heating for a reflux reaction, keeping a temperature at 220-260° C. and checking an acid value; cooling to 180-220° C. when the acid value drops to below 5 mgKOH/g, and then performing vacuum distillation while controlling a vacuum degree at −0.065-−0.095 MPa; cooling and discharging when the acid value of a rectification product drops to below 1.0 mgKOH/g and a mass fraction of a water content is less than 0.1%, so as to obtain the polyester polyol; wherein the certain mass percentage is: the organic acid 10-20%, and the epoxy soybean oil polyol 80-90%; an adding amount of the esterification catalyst is 0.1-0.5% of the total reactant mass.

Specific reaction principles are as follows.

(1) The Ò-type structure epoxy soybean oil and the small molecular alcohol undergo the open-ring etherification with the organic acid catalyst to form the Ò-type structure epoxy soybean oil polyol; and the Ò-type structure epoxy soybean oil polyol and the organic acid undergo the esterification reaction with the esterification catalyst to obtain the Ò-type structure polyester polyol; wherein a specific reaction process is as follows:

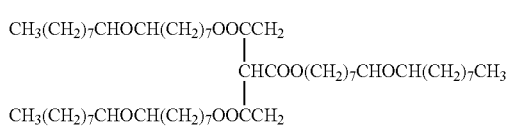

⇩

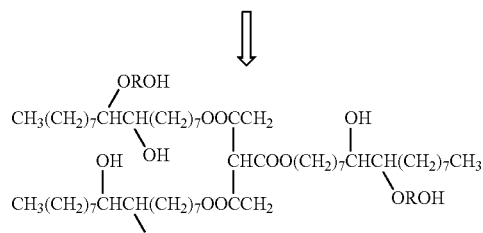

⇩

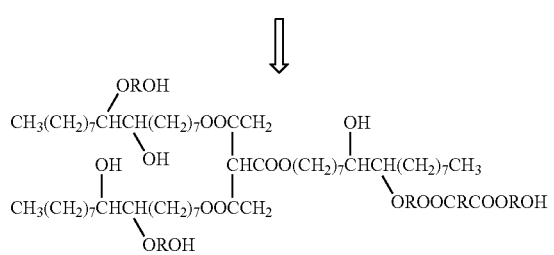

(2) The Ñ-type structure epoxy soybean oil and the small molecular alcohol undergo the open-ring etherification with the organic acid catalyst to form the Ñ-type structure epoxy soybean oil polyol; and the Ñ-type structure epoxy soybean oil polyol and the organic acid undergo the esterification reaction with the esterification catalyst to obtain the Ñ-type structure polyester polyol; wherein a specific reaction process is as follows:

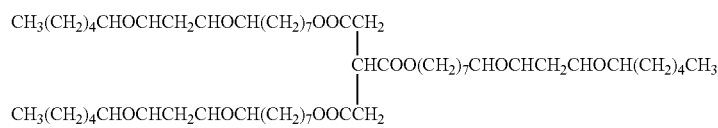

⇩

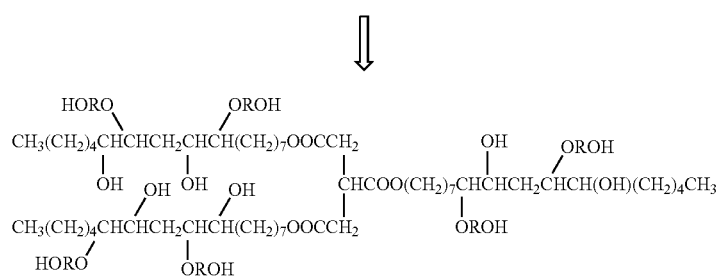

⇩

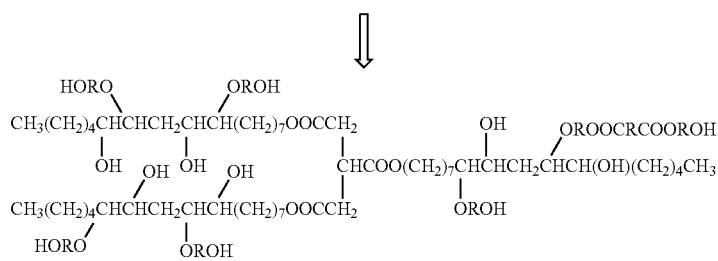

The present invention first prepares the epoxy soybean oil polyol by open-ring etherification of the epoxy soybean oil and the small molecular alcohol with the organic acid catalyst, so that an ortho position of the hydroxyl group of the epoxy soybean oil polyol has an ether bond. Then the epoxy soybean oil polyol is further esterified with the organic acid under the esterification catalyst to prepare the polyester polyol, wherein new functional groups are introduced through the esterification reaction to adjust crystalline and hydrophilic properties of a molecular system. The esterification reaction in the step (2) can occur on all primary hydroxyl groups. The above molecular structure formulas are only a part of all possible molecular structure formulas of the prepared polyester polyol. Other compounds with other connecting structures can be obtained through esterification reactions between the organic acid and different primary hydroxyl groups.

Preferably,
in the step (1), the small molecular alcohol is selected from a group consisting of glycerin, diethylene glycol, ethylene glycol, propylene glycol, dipropylene glycol, and butylene glycol.

Preferably,
in the step (1), the organic acid catalyst is selected from a group consisting of benzoic acid, benzene dicarboxylic acid or acid anhydride and esters thereof, succinic acid, adipic acid, and sebacic acid.

Preferably,
in the step (2), the organic acid is selected from a group consisting of benzoic acid, benzene dicarboxylic acid or acid anhydride and esters thereof, succinic acid, adipic acid, and sebacic acid.

Preferably,
in the step (2), the organic acid is the benzene dicarboxylic acid or the acid anhydride and the esters thereof, comprising terephthalic acid and by-products thereof, phthalic acid or the acid anhydride and by-products thereof, and isophthalic acid and by-products thereof. Preferably, in the step (2), the esterification catalyst is an organic titanate catalyst, an organic tin catalyst, calcium oxide, or zinc acetate, and the organic titanate catalyst is either isopropyl titanate or butyl titanate.

The present invention also provides applications of the above polyester polyol or the polyester polyol prepared by the above method in the polyurethane controlled-release fertilizer envelope or the polyurethane controlled-release fertilizer.

The present invention also provides a polyurethane controlled-release fertilizer envelope, which is prepared by cross-linking the s polyester polyol or the polyester polyol prepared by the above method with isocyanate. The isocyanate is selected from a group consisting of polymethylene polyphenyl polyisocyanate, toluene diisocyanate, hexamethylene diisocyanate, diphenylmethane diisocyanate (MDI), liquefied MDI, isophorone diisocyanate, 1,6-hexylene diisocyanate (HDI), HDI trimer, trimethylhexamethylene diisocyanate, xylylene diisocyanate, and dimethyl biphenyl diisocyanate. MDI is preferred due to great price advantage and lower cost.

The present invention also provides a polyurethane controlled-release fertilizer, consisting of fertilizer particles and a polyurethane controlled-release fertilizer envelope on surfaces of the fertilizer particles. The polyurethane controlled-release fertilizer envelope is formed on the surfaces of the fertilizer particles by cross-linking the above polyester polyol with isocyanate. The fertilizer particles may be common water-soluble elemental fertilizers such as: urea, ammonium sulfate, ammonium chloride, ammonium nitrate, monoammonium phosphate, diammonium phosphate, potassium chloride, potassium sulfate, potassium nitrate, magnesium sulfate, magnesium nitrate, zinc sulfate, copper sulfate and zinc chloride.

The present invention has at least the following beneficial effects:

1. The present invention adopts the epoxy soybean oil as a raw material, which is cheap and easy to obtain. The epoxy soybean oil has a wide range of sources, which is not susceptible to large fluctuations due to the influence of a single supplier, so as to effectively guarantee the timeliness of supply and the stability of cost prices.

2. The polyester polyol controlled-release fertilizer envelope material of the present invention, which is prepared by using the epoxy soybean oil, is a new type of bio-based degradable envelope material with a high biomass content, wherein biomass raw materials account for more than 50% in the polyester polyol. An envelope rate is 2.0%-3.5%, and a release period is up to 60-150 days, which can sufficiently control the release of nutrients required for plant growth. The envelope material is highly degradable and will not pollute soil, plants and environment during long-term use, which has a wide range of applications.

3. According to the present invention, the soybean oil polyol made of the epoxy soybean oil has a long carbon chain and a large branching degree. This structure provides the soybean oil polyol higher resistance to water as well as lower swelling properties, so as to be soaked in water for a long time without deformation. Furthermore, because the epoxy soybean oil polyol has a relatively large functionality and a relatively high glass transition temperature, downstream products produced by the reaction have relatively large correlation and good thermal stability.

DETAILED DESCRIPTION OF THE PREFERRED EMBODIMENT

The present invention provides a polyester polyol with a high biomass ratio for a polyurethane controlled-release fertilizer envelope, comprising a compound having an Ñ-type structure as shown in a formula (1) and a compound having an ( ) type structure as shown in a formula (2):

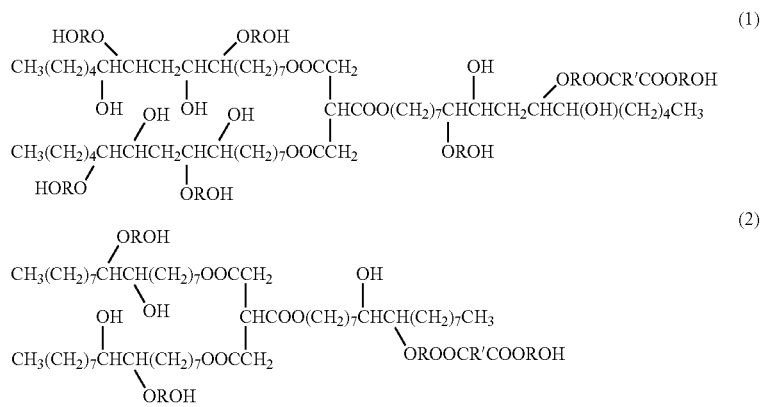

wherein R is selected from a group consisting of: $CH_2CH_2$, $CH_2CH_2OCH_2CH_2$, $CH_2CH(CH_3)$, $CH_2CH(CH_3)OCH_2CH(CH_3)$, $CH_2CH_2CH_2CH_2$ and $CH_2CH(OH)CH_2$; R' is selected from a group consisting of: Ph, $CH_2CH_2CH_2CH_2$, $CH_2CH_2$ and $CH_2(CH_2)_6CH_2$.

A hydroxyl value of the compound having the Ñ-type structure as shown in the formula (1) is 150-350 mgKOH/g. A hydroxyl value of the compound having the Ò-type structure as shown in the formula (2) is 150-350 mgKOH/g.

Specifically, for preparing the polyester polyol, the present invention first prepares the epoxy soybean oil polyol by open-ring etherification of the epoxy soybean oil and the small molecular alcohol with the organic acid catalyst, so that an ortho position of the hydroxyl group of the epoxy soybean oil polyol has an ether bond. Then the epoxy soybean oil polyol is further esterified with the organic acid under the esterification catalyst to prepare the polyester polyol, wherein new functional groups are introduced through the esterification reaction to adjust crystalline and hydrophilic properties of a molecular system. The esterification reaction can occur on all primary hydroxyl groups. The above molecular structure formulas are only a part of all possible molecular structure formulas of the prepared polyester polyol. Other compounds with other connecting structures can be obtained through esterification reactions between the organic acid and different primary hydroxyl groups. The polyester polyol of the present invention has a long carbon chain, a large branching degree, and a large functionality.

In the open-ring etherification, the small molecular alcohol is selected from a group consisting of glycerin, diethylene glycol, ethylene glycol, propylene glycol, dipropylene glycol, and butylene glycol. The organic acid catalyst is selected from a group consisting of benzoic acid, benzene dicarboxylic acid or acid anhydride and esters thereof, succinic acid, adipic acid, and sebacic acid. A molar ratio of the epoxy soybean oil and the small molecule alcohol is 1:4-1:7.5; an adding amount of the organic acid catalyst is 0.1-0.5% of a total reactant mass.

In the esterification, the organic acid is selected from a group consisting of benzoic acid, benzene dicarboxylic acid or acid anhydride and esters thereof, succinic acid, adipic acid, and sebacic acid. Specifically, the organic acid is the benzene dicarboxylic acid or the acid anhydride and the esters thereof, comprising terephthalic acid and by-products thereof, phthalic acid or the acid anhydride and by-products thereof, and isophthalic acid and by-products thereof. The esterification catalyst is an organic titanate catalyst, an organic tin catalyst, calcium oxide, or zinc acetate, and the organic titanate catalyst is either isopropyl titanate or butyl titanate. A mass percentage is: the organic acid 10-20%, and the epoxy soybean oil polyol 80-90%; and an adding amount of the esterification catalyst is 0.1-0.5% of the total reactant mass.

Referring to accompanying embodiments, the present invention will be further illustrated.

Embodiment 1

I. The embodiment 1 provides a method for preparing epoxy soybean oil polyester polyol, comprising steps of:

1) putting 0.1 mol glycerin, 3.3 mol diethylene glycol, 0.5 mol ethylene glycol and 0.1 mol butanediol into a reactor, and adding benzoic acid of 0.1-0.5% of a total reactant weight as a catalyst; heating to 120° C., then stopping heating and adding 1 mol epoxy soybean oil to the reactor in batches to perform an open-ring etherification reaction; controlling a reaction temperature of reactants at 160° C. until a required amount of the epoxy soybean oil is added; keeping a reaction solution at 180° C. for 1 hour and then cooling to obtain a yellow transparent viscous liquid, which is the epoxy soybean oil polyol, for subsequent use;

2) adding 909 g epoxy soybean oil polyol obtained in the step 1), 48 g phthalic anhydride, 54 g terephthalic acid and 10 g benzoic acid into a reaction vessel, then adding an isopropyl titanate catalyst with an addition amount of 0.1-0.5% of a total reactant mass, and heating for a reflux reaction; keeping temperature at 220° C. and checking the acid value; cooling to 180° C. when the acid value drops to below 5 mgKOH/g, and then performing vacuum distillation while controlling a vacuum degree at −0.065--0.095 MPa; cooling and discharging when the acid value of a rectification product drops to below 1.0 mgKOH/g and a mass fraction of a water content is less than 0.1%, so as to obtain the polyester polyol.

II. According to a Chinese national standard GB/T12008.3-2009, a phthalic anhydride method is used for measurement. The prepared polyester polyol prepared has a hydroxyl value of 170.2 mgKOH/g, a viscosity of 16250 CPS/25° C., an acid value of 0.89 mgKOH/g, and a water content of 0.05%.

Embodiment 2

I. The embodiment 2 provides a method for preparing an enveloped polyurethane controlled-release fertilizer with the polyester polyol synthesized in the embodiment 1, comprising steps of:

weighing and adding 1 kg granular urea with a particle size of 2.00 mm-4.75 mm into a sugar coating machine for heating at 60° C.; mixing and adding 2.8 g polymeric MDI and 4.2 g polyester polyol into the granular urea, wherein an envelope material cross-links on surfaces of the granular urea to form a polyurethane controlled-release envelope, a viscosity is increased, and an envelope rate of 0.7%; repeating the above steps for 3 times, and adding 2.8 g polymeric MDI and 4.2 g polyester polyol for the second and third times, respectively, until the envelope rate is 2.1%; curing for 3-5 minutes until the envelope material becomes dense on the surface of the urea, so as to form the tough polyurethane controlled-release envelope; finally, adding paraffin of 0.2% of the total weight of the fertilizer to prevent adhesion between the fertilizer particles; cooling to 20° C. to obtain the enveloped polyurethane urea made of the epoxy soybean oil polyester polyol.

II. Test on controlled-release performance of the enveloped controlled-release fertilizer A nutrient release period of the enveloped controlled-release fertilizer was tested at 25° C. by a static water extraction method, which was expressed as the number of days required for a cumulative nutrient release rate to reach 80%.

The nutrient release period of the enveloped controlled-release fertilizer prepared in the embodiment 2 is 60 days.

Embodiment 3

I. The embodiment 3 provides a method for preparing epoxy soybean oil polyester polyol, comprising steps of:

1) putting 0.1 mol glycerin, 3.3 mol diethylene glycol, 0.5 mol ethylene glycol and 0.1 mol butanediol into a reactor, and adding benzenedicarboxylic acid of 0.1-0.5% of a total reactant weight as a catalyst; heating to 120° C., then stopping heating and adding 1 mol epoxy soybean oil to the reactor in batches to perform an open-ring etherification reaction; controlling a reaction temperature of reactants at 160° C. until a required amount of the epoxy soybean oil is added; keeping a reaction solution at 180° C. for 1 hour and then cooling to obtain a yellow transparent viscous liquid, which is the epoxy soybean oil polyol, for subsequent use;

2) adding 910 g epoxy soybean oil polyol obtained in the step 1), 53 g isophthalic acid, 47 g adipic acid and 10 g benzoic acid into a reaction vessel, then adding an isopropyl titanate catalyst with an addition amount of 0.1-0.5% of a total reactant mass, and heating for a reflux reaction; keeping temperature at 230° C. and checking the acid value; cooling to 190° C. when the acid value drops to below 5 mgKOH/g, and then performing vacuum distillation while controlling a vacuum degree at −0.065--0.095 MPa; cooling and discharging when the acid value of a rectification product drops to below 1.0 mgKOH/g and a mass fraction of a water content is less than 0.1%, so as to obtain the polyester polyol.

II. According to a Chinese national standard GB/T12008.3-2009, a phthalic anhydride method is used for measurement. The prepared polyester polyol prepared has a hydroxyl value of 172.6 mgKOH/g, a viscosity of 8720 CPS/25° C., an acid value of 0.92 mgKOH/g, and a water content of 0.06%.

Embodiment 4

I. The embodiment 4 provides a method for preparing an enveloped polyurethane controlled-release fertilizer with the polyester polyol synthesized in the embodiment 3, comprising steps of:

weighing and adding 1 kg granular urea with a particle size of 2.00 mm-4.75 mm into a sugar coating machine for heating at 62° C.; mixing and adding 2.8 g polymeric MDI and 4.2 g polyester polyol into the granular urea, wherein an envelope material cross-links on surfaces of the granular urea to form a polyurethane controlled-release envelope, a viscosity is increased, and an envelope rate of 0.7%; repeating the above steps for 3 times, and adding 2.8 g polymeric MDI and 4.2 g polyester polyol for the second and third times, respectively, until the envelope rate is 2.1%; curing for 3-5 minutes until the envelope material becomes dense on the surface of the urea, so as to form the tough polyurethane controlled-release envelope; finally, adding paraffin of 0.2% of the total weight of the fertilizer to prevent adhesion between the fertilizer particles; cooling to 20° C. to obtain the enveloped polyurethane urea made of the epoxy soybean oil polyester polyol.

II. Test on controlled-release performance of the enveloped controlled-release fertilizer The test method is the same as that of the embodiment 2.

The nutrient release period of the enveloped controlled-release fertilizer prepared in the embodiment 4 is 60 days.

Embodiment 5

I. The embodiment 5 provides a method for preparing epoxy soybean oil polyester polyol, comprising steps of:
1) putting 0.2 mol glycerin, 3.8 mol diethylene glycol, 0.8 mol ethylene glycol and 0.2 mol butanediol into a reactor, and adding succinic acid of 0.1-0.5% of a total reactant weight as a catalyst; heating to 130° C., then stopping heating and adding 1 mol epoxy soybean oil to the reactor in batches to perform an open-ring etherification reaction; controlling a reaction temperature of reactants at 170° C. until a required amount of the epoxy soybean oil is added; keeping a reaction solution at 180° C. for 1 hour and then cooling to obtain a yellow transparent viscous liquid, which is the epoxy soybean oil polyol, for subsequent use;
2) adding 894 g epoxy soybean oil polyol obtained in the step 1), 88 g phthalic anhydride, and 18 g ethanedioic acid into a reaction vessel, then adding a calcium oxide catalyst with an addition amount of 0.1-0.5% of a total reactant mass, and heating for a reflux reaction; keeping temperature at 230° C. and checking the acid value; cooling to 190° C. when the acid value drops to below 5 mgKOH/g, and then performing vacuum distillation while controlling a vacuum degree at −0.065--0.095 MPa; cooling and discharging when the acid value of a rectification product drops to below 1.0 mgKOH/g and a mass fraction of a water content is less than 0.1%, so as to obtain the polyester polyol.

II. According to a Chinese national standard GB/T12008.3-2009, a phthalic anhydride method is used for measurement. The prepared polyester polyol prepared has a hydroxyl value of 215.6 mgKOH/g, a viscosity of 11050 CPS/25° C., an acid value of 0.76 mgKOH/g, and a water content of 0.06%.

Embodiment 6

I. The embodiment 6 provides a method for preparing an enveloped polyurethane controlled-release fertilizer with the polyester polyol synthesized in the embodiment 5, comprising steps of:

weighing and adding 1 kg granular urea with a particle size of 2.00 mm-4.75 mm into a sugar coating machine for heating at 62° C.; mixing and adding 3.6 g polymeric MDI and 5.4 g polyester polyol into the granular urea, wherein an envelope material cross-links on surfaces of the granular urea to form a polyurethane controlled-release envelope, a viscosity is increased, and an envelope rate of 0.9%; adding 3.2 g polymeric MDI and 4.8 g polyester polyol for the second and third times with both envelope rates of 0.8%, respectively, until a final envelope rate is 2.5%; curing for 3-5 minutes until the envelope material becomes dense on the surface of the urea, so as to form the tough polyurethane controlled-release envelope; finally, adding paraffin of 0.2% of the total weight of the fertilizer to prevent adhesion between the fertilizer particles; cooling to 20° C. to obtain the enveloped polyurethane urea made of the epoxy soybean oil polyester polyol.

II. Test on controlled-release performance of the enveloped controlled-release fertilizer The test method is the same as that of the embodiment 2.

The nutrient release period of the enveloped controlled-release fertilizer prepared in the embodiment 6 is 90 days.

Embodiment 7

I. The embodiment 7 provides a method for preparing epoxy soybean oil polyester polyol, comprising steps of:
1) putting 0.2 mol glycerin, 3.8 mol diethylene glycol, 0.8 mol ethylene glycol and 0.2 mol butanediol into a reactor, and adding adipic acid of 0.1-0.5% of a total reactant weight as a catalyst; heating to 130° C., then stopping heating and adding 1 mol epoxy soybean oil to the reactor in batches to perform an open-ring etherification reaction; controlling a reaction temperature of reactants at 170° C. until a required amount of the epoxy soybean oil is added; keeping a reaction solution at 180° C. for 1 hour and then cooling to obtain a yellow transparent viscous liquid, which is the epoxy soybean oil polyol, for subsequent use;
2) adding 895 g epoxy soybean oil polyol obtained in the step 1), 44 g phthalic anhydride, 50 g terephthalic acid, and 5 g benzoic acid into a reaction vessel, then adding a zinc acetate catalyst with an addition amount of 0.1-0.5% of a total reactant mass, and heating for a reflux reaction; keeping temperature at 230° C. and checking the acid value; cooling to 190° C. when the acid value drops to below 5 mgKOH/g, and then performing vacuum distillation while controlling a vacuum degree at −0.065--0.095 MPa; cooling and discharging when the acid value of a rectification product drops to below 1.0 mgKOH/g and a mass fraction of a water content is less than 0.1%, so as to obtain the polyester polyol.

II. According to a Chinese national standard GB/T12008.3-2009, a phthalic anhydride method is used for measurement. The prepared polyester polyol prepared has a hydroxyl value of 230.8 mgKOH/g, a viscosity of 13800 CPS/25° C., an acid value of 0.88 mgKOH/g, and a water content of 0.06%.

Embodiment 8

I. The embodiment 8 provides a method for preparing an enveloped polyurethane controlled-release fertilizer with the polyester polyol synthesized in the embodiment 7, comprising steps of:
weighing and adding 1 kg granular urea with a particle size of 2.00 mm-4.75 mm into a sugar coating machine for heating at 62° C.; mixing and adding 3.6 g polymeric MDI and 5.4 g polyester polyol into the granular urea, wherein an envelope material cross-links on surfaces of the granular urea to form a polyurethane controlled-release envelope, a viscosity is increased, and an envelope rate of 0.9%; adding 3.2 g polymeric MDI and 4.8 g polyester polyol for the second and third times with both envelope rates of 0.8%, respectively, until a final envelope rate is 2.5%; curing for 3-5 minutes until the envelope material becomes dense on the surface of the urea, so as to form the tough polyurethane controlled-release envelope; finally, adding paraffin of 0.2% of the total weight of the fertilizer to prevent adhesion between the fertilizer particles; cooling to 20° C. to obtain the enveloped polyurethane urea made of the epoxy soybean oil polyester polyol.

II. Test on controlled-release performance of the enveloped controlled-release fertilizer The test method is the same as that of the embodiment 2.

The nutrient release period of the enveloped controlled-release fertilizer prepared in the embodiment 8 is 90 days.

Embodiment 9

I. The embodiment 9 provides a method for preparing epoxy soybean oil polyester polyol, comprising steps of:
1) putting 0.2 mol glycerin, 4.5 mol diethylene glycol, 1.0 mol ethylene glycol and 0.3 mol butanediol into a reactor, and adding sebacic acid of 0.1-0.5% of a total reactant weight as a catalyst; heating to 140° C., then stopping heating and adding 1 mol epoxy soybean oil to the reactor in batches to perform an open-ring etherification reaction; controlling a reaction temperature of reactants at 180° C. until a required amount of the epoxy soybean oil is added; keeping a reaction solution at 190° C. for 1 hour and then cooling to obtain a yellow transparent viscous liquid, which is the epoxy soybean oil polyol, for subsequent use;
2) adding 793 g epoxy soybean oil polyol obtained in the step 1), 111 g phthalic anhydride, and 73 g terephthalic acid into a reaction vessel, then adding a butyl titanate catalyst with an addition amount of 0.1-0.5% of a total reactant mass, and heating for a reflux reaction; keeping temperature at 240° C. and checking the acid value; cooling to 200° C. when the acid value drops to below 5 mgKOH/g, and then performing vacuum distillation while controlling a vacuum degree at −0.065--−0.095 MPa; cooling and discharging when the acid value of a rectification product drops to below 1.0 mgKOH/g and a mass fraction of a water content is less than 0.1%, so as to obtain the polyester polyol.

II. According to a Chinese national standard GB/T12008.3-2009, a phthalic anhydride method is used for measurement. The prepared polyester polyol prepared has a hydroxyl value of 155.6 mgKOH/g, a viscosity of 15780 CPS/25° C., an acid value of 0.67 mgKOH/g, and a water content of 0.08%.

Embodiment 10

I. The embodiment 10 provides a method for preparing an enveloped polyurethane controlled-release fertilizer with the polyester polyol synthesized in the embodiment 9, comprising steps of:
weighing and adding 1 kg granular urea with a particle size of 2.00 mm-4.75 mm into a sugar coating machine for heating at 65° C.; mixing and adding 2.8 g polymeric MDI and 4.2 g polyester polyol into the granular urea, wherein an envelope material cross-links on surfaces of the granular urea to form a polyurethane controlled-release envelope, a viscosity is increased, and an envelope rate of 1.0%; repeating the above steps for 3 times, and adding 4 g polymeric MDI and 6 g polyester polyol for the second and third times, respectively, until the envelope rate is 3.0%; curing for 3-5 minutes until the envelope material becomes dense on the surface of the urea, so as to form the tough polyurethane controlled-release envelope; finally, adding paraffin of 0.2% of the total weight of the fertilizer to prevent adhesion between the fertilizer particles; cooling to 20° C. to obtain the enveloped polyurethane urea made of the epoxy soybean oil polyester polyol.

II. Test on controlled-release performance of the enveloped controlled-release fertilizer The test method is the same as that of the embodiment 2.

The nutrient release period of the enveloped controlled-release fertilizer prepared in the embodiment 10 is 120 days.

Embodiment 11

I. The embodiment 11 provides a method for preparing epoxy soybean oil polyester polyol, comprising steps of:
1) putting 0.2 mol glycerin, 4.5 mol diethylene glycol, 1.0 mol ethylene glycol and 0.3 mol butanediol into a reactor, and adding benzoic acid of 0.1-0.5% of a total reactant weight as a catalyst; heating to 140° C., then stopping heating and adding 1 mol epoxy soybean oil to the reactor in batches to perform an open-ring etherification reaction; controlling a reaction temperature of reactants at 160° C. until a required amount of the epoxy soybean oil is added; keeping a reaction solution at 190° C. for 1 hour and then cooling to obtain a yellow transparent viscous liquid, which is the epoxy soybean oil polyol, for subsequent use;
2) adding 872 g epoxy soybean oil polyol obtained in the step 1), 45 g terephthalic acid and 80 g ethanedioic acid into a reaction vessel, then adding an isopropyl titanate catalyst with an addition amount of 0.1-0.5% of a total reactant mass, and heating for a reflux reaction; keeping temperature at 240° C. and checking the acid value; cooling to 200° C. when the acid value drops to below 5 mgKOH/g, and then performing vacuum distillation while controlling a vacuum degree at −0.065--−0.095 MPa; cooling and discharging when the acid value of a rectification product drops to below 1.0 mgKOH/g and a mass fraction of a water content is less than 0.1%, so as to obtain the polyester polyol.

II. According to a Chinese national standard GB/T12008.3-2009, a phthalic anhydride method is used for measurement. The prepared polyester polyol prepared has a hydroxyl value of 236.7 mgKOH/g, a viscosity of 4320 CPS/25° C., an acid value of 0.83 mgKOH/g, and a water content of 0.09%.

Embodiment 12

I. The embodiment 12 provides a method for preparing an enveloped polyurethane controlled-release fertilizer with the polyester polyol synthesized in the embodiment 11, comprising steps of:
weighing and adding 1 kg granular urea with a particle size of 2.00 mm-4.75 mm into a sugar coating machine for heating at 65° C.; mixing and adding 2.8 g polymeric MDI and 4.2 g polyester polyol into the granular urea, wherein an envelope material cross-links on surfaces of the granular urea to form a polyurethane controlled-release envelope, a viscosity is increased, and an envelope rate of 1.0%; repeating the above steps for 3 times, and adding 4 g polymeric MDI and 6 g polyester polyol for the second and third times, respectively, until the envelope rate is 3.0%; curing for 3-5 minutes until the envelope material becomes dense on the surface of the urea, so as to form the tough polyurethane controlled-release envelope; finally, adding paraffin of 0.2% of the total weight of the fertilizer to prevent adhesion between the fertilizer particles; cooling to 20° C. to obtain the enveloped polyurethane urea made of the epoxy soybean oil polyester polyol.

II. Test on controlled-release performance of the enveloped controlled-release fertilizer The test method is the same as that of the embodiment 2.
The nutrient release period of the enveloped controlled-release fertilizer prepared in the embodiment 12 is 120 days.

Embodiment 13

I. The embodiment 13 provides a method for preparing epoxy soybean oil polyester polyol, comprising steps of:
1) putting 0.6 mol glycerin, 5 mol diethylene glycol, 0.5 mol ethylene glycol and 1.4 mol butanediol into a reactor, and adding benzoic acid of 0.1-0.5% of a total reactant weight as a catalyst; heating to 150° C., then stopping heating and adding 1 mol epoxy soybean oil to the reactor in batches to perform an open-ring etherification reaction; controlling a reaction temperature of reactants at 200° C. until a required amount of the epoxy soybean oil is added; keeping a reaction solution at 200° C. for 1 hour and then cooling to obtain a yellow transparent viscous liquid, which is the epoxy soybean oil polyol, for subsequent use;
2) adding 872 g epoxy soybean oil polyol obtained in the step 1), 37 g phthalic anhydride, 42 g isophthalic acid and 18 g ethanedioic acid into a reaction vessel, then adding an isopropyl titanate catalyst with an addition amount of 0.1-0.5% of a total reactant mass, and heating for a reflux reaction; keeping temperature at 250° C. and checking the acid value; cooling to 210° C. when the acid value drops to below 5 mgKOH/g, and then performing vacuum distillation while controlling a vacuum degree at −0.065-−0.095 MPa; cooling and discharging when the acid value of a rectification product drops to below 1.0 mgKOH/g and a mass fraction of a water content is less than 0.1%, so as to obtain the polyester polyol.

II. According to a Chinese national standard GB/T12008.3-2009, a phthalic anhydride method is used for measurement. The prepared polyester polyol prepared has a hydroxyl value of 318.7 mgKOH/g, a viscosity of 5760 CPS/25° C., an acid value of 0.77 mgKOH/g, and a water content of 0.08%.

Embodiment 14

I. The embodiment 14 provides a method for preparing an enveloped polyurethane controlled-release fertilizer with the polyester polyol synthesized in the embodiment 13, comprising steps of:
weighing and adding 1 kg granular urea with a particle size of 2.00 mm-4.75 mm into a sugar coating machine for heating at 68° C.; mixing and adding 4.4 g polymeric MDI and 6.6 g polyester polyol into the granular urea, wherein an envelope material cross-links on surfaces of the granular urea to form a polyurethane controlled-release envelope, a viscosity is increased, and an envelope rate of 1.1%; adding 4.8 g polymeric MDI and 7.2 g polyester polyol for the second and third times, respectively, until the envelope rate is 3.5%; curing for 3-5 minutes until the envelope material becomes dense on the surface of the urea, so as to form the tough polyurethane controlled-release envelope; finally, adding paraffin of 0.2% of the total weight of the fertilizer to prevent adhesion between the fertilizer particles; cooling to 20° C. to obtain the enveloped polyurethane urea made of the epoxy soybean oil polyester polyol.

II. Test on controlled-release performance of the enveloped controlled-release fertilizer The test method is the same as that of the embodiment 2.
The nutrient release period of the enveloped controlled-release fertilizer prepared in the embodiment 14 is 150 days.

Embodiment 15

I. The embodiment 15 provides a method for preparing epoxy soybean oil polyester polyol, comprising steps of:
1) putting 0.6 mol glycerin, 5 mol diethylene glycol, 0.5 mol ethylene glycol and 1.4 mol butanediol into a reactor, and adding benzoic acid of 0.1-0.5% of a total reactant weight as a catalyst; heating to 160° C., then stopping heating and adding 1 mol epoxy soybean oil to the reactor in batches to perform an open-ring etherification reaction; controlling a reaction temperature of reactants at 200° C. until a required amount of the epoxy soybean oil is added; keeping a reaction solution at 200° C. for 1 hour and then cooling to obtain a yellow transparent viscous liquid, which is the epoxy soybean oil polyol, for subsequent use;
2) adding 837 g epoxy soybean oil polyol obtained in the step 1), 71 g phthalic anhydride, and 80 g terephthalic acid into a reaction vessel, then adding an isopropyl titanate catalyst with an addition amount of 0.1-0.5% of a total reactant mass, and heating for a reflux reaction; keeping temperature at 260° C. and checking the acid value; cooling to 220° C. when the acid value drops to below 5 mgKOH/g, and then performing vacuum distillation while controlling a vacuum degree at −0.065-−0.095 MPa; cooling and discharging when the acid value of a rectification product drops to below 1.0 mgKOH/g and a mass fraction of a water content is less than 0.1%, so as to obtain the polyester polyol.

II. According to a Chinese national standard GB/T12008.3-2009, a phthalic anhydride method is used for measurement. The prepared polyester polyol prepared has a hydroxyl value of 286.4 mgKOH/g, a viscosity of 18670 CPS/25° C., an acid value of 0.77 mgKOH/g, and a water content of 0.07%.

Embodiment 16

I. The embodiment 16 provides a method for preparing an enveloped polyurethane controlled-release fertilizer with the polyester polyol synthesized in the embodiment 15, comprising steps of:

weighing and adding 1 kg granular urea with a particle size of 2.00 mm-4.75 mm into a sugar coating machine for heating at 68° C.; mixing and adding 4.4 g polymeric MDI and 6.6 g polyester polyol into the granular urea, wherein an envelope material cross-links on surfaces of the granular urea to form a polyurethane controlled-release envelope, a viscosity is increased, and an envelope rate of 1.1%; adding 4.8 g polymeric MDI and 7.2 g polyester polyol for the second and third times, respectively, until the envelope rate is 3.5%; curing for 3-5 minutes until the envelope material becomes dense on the surface of the urea, so as to form the tough polyurethane controlled-release envelope; finally, adding paraffin of 0.2% of the total weight of the fertilizer to prevent adhesion between the fertilizer particles; cooling to 20° C. to obtain the enveloped polyurethane urea made of the epoxy soybean oil polyester polyol.

II. Test on controlled-release performance of the enveloped controlled-release fertilizer The test method is the same as that of the embodiment 2.

The nutrient release period of the enveloped controlled-release fertilizer prepared in the embodiment 16 is 150 days.

Application Example

I. Sample: the enveloped controlled-release fertilizer prepared in the embodiments 2, 4, 6, 8, 10, 12, 14 and 16.

2. The nutrient release period of the enveloped polyurethane controlled-release fertilizer prepared in the embodiments 2, 4, 6, 8, 10, 12, 14 and 16 were tested by the static water extraction at 25° C. Cumulative release rates of nitrogen in static water were detected by sampling in different days. The sampling was carried out at 24 h, 7 d, 28 d, 56 d, 60 d, 90 d, 120 d, 150 d, and finally the cumulative release rate of nitrogen in static water extraction of the enveloped urea of the above embodiments were recorded and shown in Table 1.

TABLE 1

Measurement data of cumulative release rate of nitrogen in static water extraction of enveloped urea of different embodiments

| Group | 24 h initial release rate of nitrogen | 7 d cumulative release rate of nitrogen | 28 d cumulative release rate of nitrogen | 56 d cumulative release rate of nitrogen | 60 d cumulative release rate of nitrogen | 90 d cumulative release rate of nitrogen | 120 d cumulative release rate of nitrogen | 150 d cumulative release rate of nitrogen |
|---|---|---|---|---|---|---|---|---|
| Embodiment 2 | 1.12 | 8.09 | 53.79 | 77.77 | 78.75 | | | |
| Embodiment 4 | 1.24 | 8.16 | 52.95 | 74.39 | 77.02 | | | |
| Embodiment 6 | 0.72 | 6.34 | 26.22 | 59.74 | 66.83 | 84.03 | | |
| Embodiment 8 | 0.69 | 6.37 | 25.98 | 48.89 | 67.02 | 85.36 | | |
| Embodiment 10 | 0.13 | 2.55 | 5.65 | 24.03 | 33.90 | 61.77 | 81.16 | |
| Embodiment 12 | 0.21 | 2.47 | 5.47 | 22.97 | 33.17 | 60.96 | 80.91 | |
| Embodiment 14 | 0.09 | 1.26 | 4.66 | 15.69 | 22.04 | 40.88 | 62.45 | 83.11 |
| Embodiment 16 | 0.11 | 1.31 | 4.81 | 16.02 | 23.13 | 41.09 | 63.16 | 82.85 |

The foregoing descriptions are only the embodiments of the present invention and are not intended to be limiting. Although the present invention has been described in detail with reference to the foregoing embodiments, for those skilled in the art, the recorded technical solutions can be modified, or some of the technical features can be equivalently replaced. Such modification, equivalent replacement and improvement made within the spirit and principle of the present invention should be included in the protection scope of the present invention.

What is claimed is:

1. A method for preparing a polyester polyol, comprising steps of:
   (1) processing an epoxy soybean oil and a small molecular alcohol with an organic acid catalyst to form an epoxy soybean oil polyol through an open-ring etherification reaction, which comprises specific steps of:
   adding a certain proportion of the organic acid catalyst into the small molecular alcohol in a reactor, then heating to 120-160° C.; stopping heating and adding the epoxy soybean oil to the reactor in batches to perform the open-ring etherification reaction until a required amount of the epoxy soybean oil is added; keeping a reaction solution at 180-200° C. for 1-3 hours and then cooling to obtain a yellow transparent viscous liquid, which is the epoxy soybean oil polyol, for subsequent use; wherein a molar ratio of the epoxy soybean oil and the small molecule alcohol is 1:4-1:7.5; an adding amount of the organic acid catalyst is 0.1-0.5% of a total mass of the small molecular alcohol and the organic acid catalyst; and
   (2) processing the epoxy soybean oil polyol and an organic acid with an esterification catalyst to form the polyester polyol, which comprises specific steps of:
   adding the epoxy soybean oil polyol prepared in the step (1) and the organic acid into the reactor according to a certain mass percentage, then adding the esterification catalyst and heating for a reflux reaction, keeping a temperature at 220-260° C. and checking an acid value; cooling to 180-220° C. when the acid value drops to below 5 mgKOH/g, and then performing vacuum distillation while controlling a relative vacuum degree at −0.065-0.095 MPa; cooling and discharging when the acid value of a rectification product drops to below 1.0 mgKOH/g and a mass fraction of a water content is less than 0.1%, so as to obtain the polyester polyol; wherein the certain mass percentage is: the organic acid 10-20%, and the epoxy soybean oil polyol 80-90%; an a adding amount of the esterification catalyst is 0.1-0.5% of the total reactant mass, wherein the obtained polyester polyol comprises a compound having an Ñ-type structure as shown in a formula (1) and a compound having an Ô-type structure as shown in a formula (2):

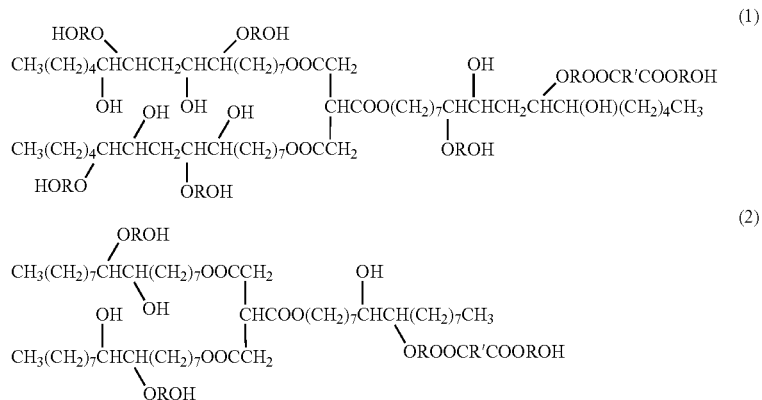

wherein R is selected from a group consisting of, $CH_2CH_2$, $CH_2CH_2OCH_2CH_2$, $CH_2CH(CH_3)$, $CH_2CH(CH_3)OCH_2CH(CH_3)$, $CH_2CH_2CH_2CH_2$ and $CH_2CH(OH)CH_2$; R' is selected from a group consisting of Ph, $CH_2CH_2CHCH_2$, $CH_2CH_2$ and $CH_2(CH_2)_6CH_2$.

2. The method, as recited in claim 1, wherein:
in the step (1), the small molecular alcohol is selected from a group consisting of glycerin, diethylene glycol, ethylene glycol, propylene glycol, dipropylene glycol, and butylene glycol.

3. The method, as recited in claim 1 wherein:
in the step (1), the organic acid catalyst is selected from a group consisting of benzoic acid, benzene dicarboxylic acid, succinic acid, adipic acid, and sebacic acid.

4. The method, as recited in claim 1, wherein:
in the step (2), the organic acid is benzene dicarboxylic acid.

5. The method, as recited in claim 4, wherein in the step (2), the organic acid is terephthalic acid.

6. The method, as recited in claim 1, wherein:
in the step (2), the esterification catalyst is an organic titanate catalyst, an organic tin catalyst, calcium oxide, or zinc acetate.

7. The method, as recited in claim 6, wherein:
the organic titanate catalyst is either isopropyl titanate or butyl titanate.

8. The method, as recited in claim 1 wherein:
a hydroxyl value of the compound having the N-type structure as shown in the formula (1) is 150-350 mgKOH/g.

9. The method, as recited in claim 1 wherein:
a hydroxyl value of the compound having the Ô-type structure as shown in the formula (2) is 150-350 mgKOH/g.

* * * * *